United States Patent
Merkel et al.

(10) Patent No.: US 10,148,204 B2
(45) Date of Patent: Dec. 4, 2018

(54) METHOD FOR OPERATING AN ELECTRIC MACHINE IN A SHORT-CIRCUIT MODE

(75) Inventors: Tino Merkel, Schwieberdingen (DE); Dragan Mikulec, Erlangen (DE)

(73) Assignee: Robert Bosch GmbH, Stuttgart (DE)

( * ) Notice: Subject to any disclaimer, the term of this patent is extended or adjusted under 35 U.S.C. 154(b) by 1147 days.

(21) Appl. No.: 14/007,150

(22) PCT Filed: Jan. 31, 2012

(86) PCT No.: PCT/EP2012/051597
§ 371 (c)(1),
(2), (4) Date: Sep. 24, 2013

(87) PCT Pub. No.: WO2012/130503
PCT Pub. Date: Oct. 4, 2012

(65) Prior Publication Data
US 2014/0015463 A1    Jan. 16, 2014

(30) Foreign Application Priority Data
Mar. 31, 2011   (DE) .................. 10 2011 006 516

(51) Int. Cl.
*H02P 6/12* (2006.01)
*B60L 3/00* (2006.01)
(Continued)

(52) U.S. Cl.
CPC .............. *H02P 6/12* (2013.01); *B60L 3/0061* (2013.01); *B60L 7/14* (2013.01); *B60L 11/14* (2013.01); *H02P 3/22* (2013.01); *H02P 29/032* (2016.02); *B60L 2210/40* (2013.01); *B60L 2240/421* (2013.01); *B60L 2240/423* (2013.01); *B60L 2240/425* (2013.01); *B60L 2250/10* (2013.01); *Y02T 10/642* (2013.01); *Y02T 10/70* (2013.01);
(Continued)

(58) Field of Classification Search
CPC ................................. H02P 6/12; H02P 29/022
USPC .......................................................... 318/490
See application file for complete search history.

(56) References Cited

U.S. PATENT DOCUMENTS

| 6,186,130 B1 * | 2/2001 | Skinner | ................ F02P 5/1506 |
| | | | 123/625 |
| 7,372,686 B2 * | 5/2008 | Ochiai | .................. B60L 3/0023 |
| | | | 361/23 |

(Continued)

FOREIGN PATENT DOCUMENTS

| CN | 101259930 | 9/2008 |
| CN | 101323316 | 12/2008 |

(Continued)

OTHER PUBLICATIONS

International Search Report for Application No. PCT/EP2015/051597 dated Dec. 12, 2012 (3 pages).

*Primary Examiner* — Kawing Chan
(74) *Attorney, Agent, or Firm* — Michael Best & Friedrich LLP

(57) ABSTRACT

A method for operating an electric machine (24) in short-circuit operation, in particular for use in a motor vehicle, characterized by the steps of: measuring at least a first and a second phase current of the electric machine (24), comparing the measured phase currents with at least one reference value each, and outputting an error message (58) if at least one of the phase currents does not agree with the respective reference value (110, 118).

14 Claims, 2 Drawing Sheets

(51) Int. Cl.
*B60L 7/14* (2006.01)
*B60L 11/14* (2006.01)
*H02P 3/22* (2006.01)
*H02P 29/032* (2016.01)

(52) U.S. Cl.
CPC ........ *Y02T 10/7077* (2013.01); *Y02T 10/7241* (2013.01)

(56) References Cited

U.S. PATENT DOCUMENTS

| | | | | |
|---|---|---|---|---|
| 8,369,049 | B2* | 2/2013 | Kuehner | 318/798 |
| 2008/0217134 | A1* | 9/2008 | Popp | F16H 61/061 |
| | | | | 192/85.01 |
| 2010/0202089 | A1* | 8/2010 | Kuehner | B60L 3/0023 |
| | | | | 361/30 |
| 2011/0050137 | A1* | 3/2011 | Imura | H02P 21/0003 |
| | | | | 318/400.15 |
| 2012/0032683 | A1* | 2/2012 | Greif | H02P 29/021 |
| | | | | 324/537 |
| 2013/0041554 | A1* | 2/2013 | Trunk | B60L 3/0061 |
| | | | | 701/34.1 |
| 2013/0187579 | A1* | 7/2013 | Rozman | H02P 21/0035 |
| | | | | 318/400.02 |

FOREIGN PATENT DOCUMENTS

| | | |
|---|---|---|
| CN | 101997466 | 3/2011 |
| DE | 10233821 | 2/2004 |
| DE | 102006003254 | 7/2007 |
| EP | 1655829 | 5/2006 |
| KR | 100887843 | 3/2009 |
| WO | 2011009751 | 1/2011 |

\* cited by examiner

METHOD FOR OPERATING AN ELECTRIC MACHINE IN A SHORT-CIRCUIT MODE

BACKGROUND OF THE INVENTION

The present invention relates to a method for operating an electrical machine in a short-circuit operation mode, in particular for application in a motor vehicle.

Furthermore, the present invention relates to a device for operating an electrical machine in a short-circuit operation mode, in particular for use in a motor vehicle.

Finally, the present invention relates to a motor-vehicle drive train having at least one electrical machine in a short-circuit operation mode and having a device for operating the electrical machine of the type mentioned above.

A method such as this and a device such as this are known from the laid-open specification DE 10 2006 003 254 A1.

It is generally known in the field of motor-vehicle drivetrain technology to use an electrical machine as sole drive or together with a drive motor of another type (hybrid drive). Hybrid drives typically consist of a combination of an internal combustion engine and at least one electrical machine and the associated energy stores in the form of a fuel tank and a battery. Different types of hybrid drives exist, wherein a distinction is made between two basic structures, more particularly between series and parallel hybrid drives. A combination of both structures is also designated a power-split hybrid drive.

The series hybrid drive is characterized by a series circuit of energy converters. This requires for example two electrical machines and one internal combustion engine. One of the electrical machines is operated as a generator; the other electrical machine is operated as a motor. The internal combustion engine itself is not connected to a drive train of the motor vehicle. It charges up the battery via the electrical machine operated as a generator and/or directly provides the required electrical energy to the electrical machine operated as a motor. The power which is necessary for the locomotion of the motor vehicle is therefore finally transferred to the drive train from the electrical machine operated as a motor.

The parallel hybrid drive is characterized by both an internal combustion engine and an electrical machine being able to transmit the mechanical powers thereof to a drive train. By means of a mechanical coupling of the two machines and the drive train, the powers can be added together. The possibility of said power addition enables a relatively small dimensioning of the two machines, without disadvantages in terms of driving performance arising for the motor vehicle.

There are different ways of implementing parallel hybrid drives. One possibility is to connect the electrical machine directly to a crankshaft of the internal combustion engine (crankshaft starter generator) or to couple the electrical machine with the internal combustion engine by means of a belt drive. The two drive sources can therefore be used both together and individually for the locomotion of the motor vehicle. The electrical machine can also selectively be operated as a generator or as a motor.

The power-split hybrid drive is characterized by a combination of the principles which have already been illustrated. The use of a power-split transmission (planetary transmission) makes it possible to transmit a portion of the power of the internal combustion engine directly, that is to say mechanically, to the drive train while the remaining portion of the power is converted into electrical energy by means of a generator. Said electrical energy can in turn be stored in a battery or be transmitted directly to an electrical machine arranged downstream of the transmission. In the case of the power-split hybrid drive, both the electrical machine and the internal combustion engine can be used for the locomotion of the motor vehicle.

A power electronics unit typically serves to control electrical machines in a motor vehicle and in particular in a hybrid vehicle. Said system includes an inverter, which converts a DC voltage or a direct current from the (high-voltage) battery on board the motor vehicle into an alternating current. The power electronics unit conducts a high voltage of typically 60 volts.

If a fault occurs in the electrical machine, the machine is transferred into a safe state. The safe state for the electrical machine is typically the active short-circuit operation mode.

Document DE 10 2006 003 254 A1, mentioned at the outset, describes an electrical machine having a power electronics unit in a short-circuit operation mode. To handle a fault, the electrical machine is first of all switched into a freewheeling mode and then into a short-circuit operation mode.

In the case of the active short-circuit operation mode, motor windings of the electrical machine are shorted together by means of the power electronics unit. The short-circuit current which occurs owing to the short-circuit operation mode results in the electrical machine receiving a relatively small torque and therefore only slightly influences a drive train. However, if the electrical machine is erroneously put into a freewheeling mode instead of the active short-circuit operation mode, the torque (braking torque) received by the electrical machine increases. Said increased torque can, in particular at high rotational speeds, lead to the drive train being braked to the effect that a destabilization of the vehicle may result. In addition, a battery of the high-voltage system can be unintentionally charged as a result and damaged as a result.

SUMMARY OF THE INVENTION

It is therefore an object of the invention to ensure that the electrical machine is operated in short-circuit operation mode in the event of a fault.

The object is achieved by means of a method of the type mentioned at the outset, with the steps of:

detecting at least a first and a second phase current of the electrical machine, comparing the detected phase currents with in each case at least one reference value and outputting an error message if at least one of the phase currents does not match the respective reference value.

The above object is also achieved by means of a device for operating an electrical machine of the type mentioned at the outset, having a control and evaluation unit, which is designed to detect at least a first and a second phase current of the electrical machine, to compare the detected phase currents with in each case at least one reference value and to output an error message if at least one of the phase currents does not match the respective reference values.

Finally, the present invention provides a motor-vehicle drive train having at least one electrical machine in a short-circuit operation mode and having a device for operating the electrical machine of the type described above.

A short-circuit operation mode is understood here to mean the operation of the electrical machine in which electrical coils of a rotor of the electrical machine are shorted together.

The invention is based on the concept that phase currents of the electrical machine are monitored if said machine is operated in the short-circuit operation mode. On the basis of previously known reference values, it can then be determined whether the detected phase currents correspond to a short-circuit operation mode or whether a deviation and therefore another operating mode of the electrical machine is present. If another operating mode is present, for example a freewheeling mode, then the error message is output. The freewheeling mode is present when the coils of the rotor are completely electrically separated from one another.

In this case, the error message can be an electrical signal, for example, which is suitable for further processing in onboard electronics of the motor vehicle. The onboard electronics can then in turn carry out suitable countermeasures on the basis of the error message, in order to ensure a safe operation of the motor vehicle. In addition, it is conceivable that the error message contains information relating to the type of unintentional operating mode of the electrical machine. On the basis of this information, the onboard electronics can then select a particularly suitable countermeasure.

According to a preferred embodiment of the invention, a third phase current is calculated as a function of the first and second phase currents.

In this embodiment, all of the phase currents of the electrical machine are detected. It is particularly preferable for the first and second phase currents to be measured directly. On the basis of said two phase currents, the third phase current can be evaluated using electrotechnical basic equations of the electrical machine. However, it is also conceivable to measure all three phase currents directly. An advantage of calculating the third phase current on the basis of the first two phase currents is that a voltage measurement sensor and a voltage measurement line can be eliminated. Therefore, the invention can be implemented particularly economically.

According to another embodiment, reference-value ranges are used as reference values.

In this embodiment, the reference values consist of reference-value ranges. Said ranges form intervals within which the detected phase currents must lie. One advantage of this is that slight changes in the phase currents, which could otherwise lead to an erroneous output of the error message, are automatically compensated. This therefore advantageously results in the method being very robust, in particular in relation to slight or temporary deviations, for instance measurement noise or incorrect measurements.

According to another embodiment, the reference values are determined as a function of characteristic diagrams and detected parameters.

In this embodiment, the reference values are dynamically adapted to the corresponding state of the electrical machine. For this purpose, characteristic diagrams are used which are calculated in advance. Said characteristics diagrams can be deposited in a data store which can be read by the control and evaluation unit. The corresponding characteristic diagrams can then be present as a mathematical function with two variables which correspond to the parameters. Alternatively or in addition, it is conceivable that a multidimensional characteristic diagram is produced which contains predetermined data which can be read and/or interpolated as a function of the parameter values.

The characteristic diagrams are preferably adapted to the specific configuration of the corresponding motor vehicle. They are therefore optimally configured for comparison with the detected phase currents. It is particularly preferable for the characteristic diagrams to contain reference-value ranges. As a result, an optimum adaptation to the corresponding motor vehicle from using the characteristic diagrams and the robustness from using the reference-value ranges are combined in this way. Suitable parameters include state parameters of the electrical machine, which permit conclusions to be drawn about the operating state and respective period of operation of the electrical machine.

According to another preferred embodiment, a rotational speed of a rotor of the electrical machine and a temperature of the electrical machine are used as parameters.

In this embodiment, the rotational speed of the rotor of the electrical machine and the temperature of the electrical machine are detected and used to evaluate the characteristic diagrams. Said parameters are particularly well-suited for detecting the operating state of the electrical machine. An additional advantage which arises is that said parameters are typically already detected for other purposes in motor vehicles with the electrical machine and so the two parameters are easily available.

According to another preferred embodiment, a rotor position of the rotor is detected and the rotational speed of the rotor is determined as a function of the rotor position.

In this embodiment, the rotational speed is indirectly determined by means of the rotor position of the rotor. The rotor position can in turn be calculated on the basis of a change in angle of an incremental position encoder. The use of an incremental position encoder has the advantage that, by means of the measurement values thereof, both the rotational speed and the current position of the rotor can be determined. Consequently, only one sensor (the incremental position encoder) is required in order to detect a plurality of state values of the electrical machine. Here, it is advantageous that previously existing systems are often equipped with an incremental position encoder and so these can additionally be used to implement the invention in a very economical manner.

According to another embodiment, the temperature of the electrical machine is determined by means of a temperature-monitoring means.

In this embodiment, the temperature is evaluated by means of a temperature-monitoring means. The temperature-monitoring means is preferably formed by a mathematical model of the electrical machine. Detected measurement values or other determined state values are fed to said model. The mathematical model, the temperature-monitoring means, calculates the temperature of the electrical machine by means of said values fed to said model. Alternatively, it is conceivable that the temperature is measured directly in the electrical machine. It is advantageous when using the temperature-monitoring means that previously detected values, for instance the rotational speed of the rotor, the power consumption thereof and the period of operation can be used to determine the temperature. Said previously determined values are typically made available to control and evaluation units in motor vehicles. Therefore, previously available information in a motor vehicle can also be accessed here. By using the temperature-monitoring means, a temperature sensor on the electrical machine, a corresponding signal line and an associated evaluation unit can therefore be eliminated. This leads to another particularly economical refinement of the invention.

According to another embodiment, the phase currents are transformed into a fixed-rotor coordinate system by means of a mathematical transformation, in particular by means of a Park transformation, as a function of the rotor position, and the reference values are determined in that same coordinate system.

In this embodiment, the comparison between the detected phase currents and the reference values takes place in a fixed-rotor coordinate system. For this purpose, the detected phase currents are mathematically transformed by means of the transformation into the fixed-rotor coordinate system. At the same time, it is provided that the reference values are determined in the same fixed-rotor coordinate system. This has the advantage that the reference values can be compared to the phase currents in the fixed-rotor coordinate system directly without further transformation. Moreover, the transformation into the fixed-rotor coordinate system has the advantage that a short-circuit current, which is dependent on the rotational speed of the rotor and the temperature of the electrical machine, is established in said coordinate system but is subsequently constant. A particularly simple monitoring of the phase currents by means of the given reference values results from this. In particular, it is provided that, if reference-value ranges and/or characteristic diagrams are used, these are likewise determined in the fixed-rotor coordinate system.

According to another embodiment, a rotational speed of a motor-vehicle drive train, which interacts with the electrical machine, is reduced depending on the error message.

In this embodiment, a countermeasure is initiated if an error message is present. The countermeasure is intended to prevent a destabilization of the vehicle. For this purpose, the rotational speed of the motor-vehicle drive train is reduced depending on the error message. By way of example, this can take place via onboard electronics or a motor control unit, to which the error message is fed. The rotational speed is then preferably reduced until no more safety-relevant braking torque which could lead to a destabilization of the vehicle is generated by the electrical machine.

In another embodiment, a warning is output to a user depending on the error message.

In this embodiment, a warning is output to the user, for example the driver of the motor vehicle. Said user is informed of a possible danger by means of this warning and can therefore manually initiate appropriate countermeasures. In this case, it is advantageous for the user to be informed of a risk of an accident owing to a destabilization of the vehicle.

DETAILED DESCRIPTION

Figure 1:
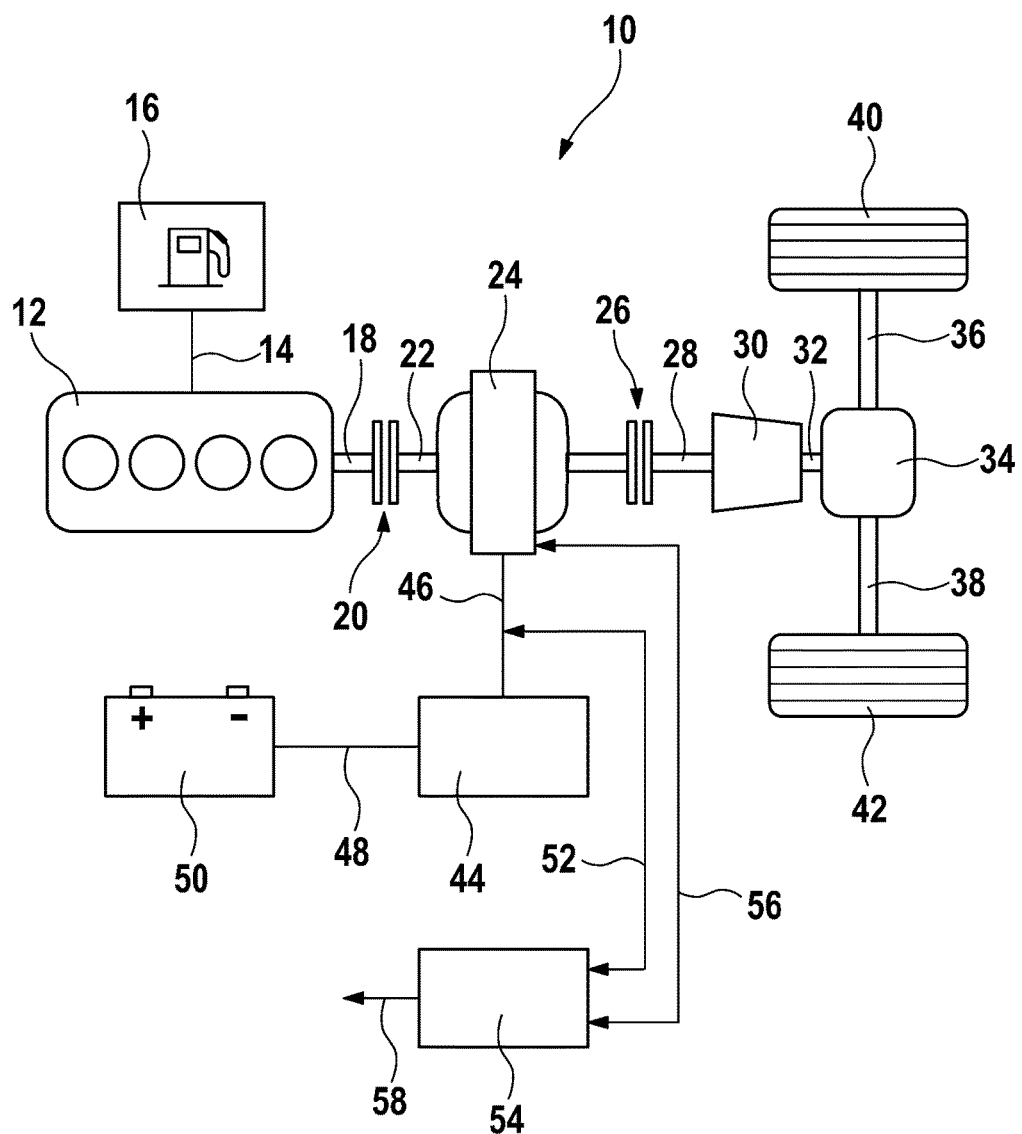
FIG. 1 schematically shows a motor-vehicle drive train in a parallel-hybrid construction in a short-circuit operation mode.

In FIG. 1, a motor-vehicle drive train in a parallel-hybrid construction is designated in its entirety with reference number 10. For the sake of completeness, it is pointed out here that the invention is not limited to a motor-vehicle drive train in a parallel-hybrid construction, but rather can be used in any vehicle having an electrical machine. The motor-vehicle drive train 10 has an internal combustion engine 12 which is connected to a fuel tank 16 via a fuel line 14. The internal combustion engine 12 has a crankshaft 18 which is connected to a clutch 20. The clutch 20 can connect the crankshaft 18 to a shaft 22. An electrical machine 24 is arranged on the shaft 22. The electrical machine 24 can be operated as a motor and, as a result, output a torque to the shaft 22. It can also be operated as a generator and consequently receive a torque from the shaft 22 (braking torque).

On the output side, the shaft 22 is connected to another clutch 26. The clutch 26 can connect the shaft 22 to a gear shaft 28. In addition, the gear shaft 28 is operatively connected to a manual transmission 30, which converts an absorbed torque. The manual transmission 30 is also operatively connected on the output side to a differential gear 34 via an output shaft 32. The differential gear 34 in turn forms an operative connection between the output shaft 32 and side axles 36 and 38. The side axle 36 is also connected to a drive wheel 40 and the side axle 38 is connected to another drive wheel 42.

The electrical machine 24 is electrically connected to a power electronics unit 44 by means of a three-phase line 46. In addition, the power electronics unit 44 is connected to a high-voltage battery 50 via an electrical line 48. The power electronics unit 44 controls the electrical machine 24. Depending on a switching state of the power electronics unit 44, the electrical machine 24 is operated as a generator or motor. In generator operating mode, an alternating current is fed from the electrical machine 24 to the power electronics unit 44 via the three-phase line 46. Said AC voltage is converted into a DC voltage in the power electronics unit 44. The DC voltage is then conducted via the line 48 to the high-voltage battery 50 and so the latter is charged. In the motor operating mode of the electrical machine 24, the electrical DC voltage is drawn from the high-voltage battery 50 via the line 48 and so the power electronics unit 44 can convert said DC voltage into an AC voltage in order to drive the electrical machine 24 via the lines 46 as a result.

A signal path 52, which originates from the line 46, runs to a control and evaluation unit 54. Measurement values of phase currents present in the line 46 are transmitted via the signal path 52. A signal path 56, which originates from the electrical machine 24, runs to the control and evaluation unit 54. A change in rotational angle of a rotor of the electrical machine 24 is transmitted along said signal path 56 to the control and evaluation unit 54. The control and evaluation unit 54 evaluates the information transmitted thereto in a manner according to the invention and so it outputs an error message 58 if necessary. The control and evaluation unit 44 is described in detail with reference to FIG. 2.

It is conceivable for the control and evaluation unit 54 to receive information from the power electronics unit 44 if the latter is intended to establish a short-circuit operation mode. The diagnosis can then be performed, as a result of which erroneous error messages are avoided.

Figure 2:
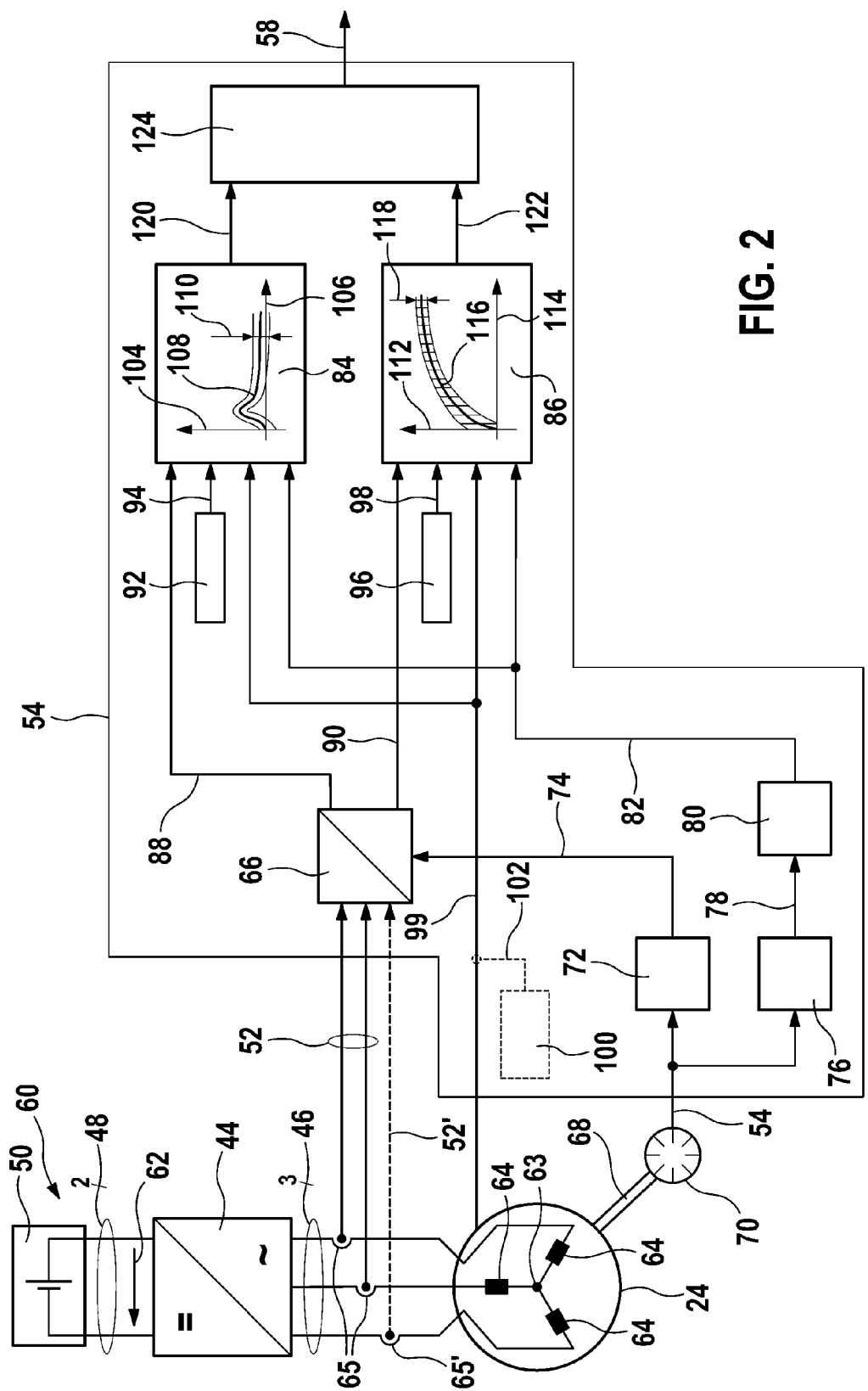
FIG. 2 shows a schematic block diagram of a control and evaluation unit of the invention, and a high-voltage system with an electrical machine in the motor-vehicle drive train.

The control and evaluation unit 54 is schematically illustrated as a block diagram in FIG. 2. A high-voltage system 60 is also schematically illustrated. The high-voltage system 60 consists of the high-voltage battery 50, the power electronics unit 44, the lines 46 and 48 and the electrical machine 24. The two lines 48, which originate from the high-voltage battery 50, run to the power electronics unit 44. Here, the two lines 48 conduct the DC voltage, which is illustrated as intermediate-circuit voltage 62. The power electronics unit 44 converts between the DC voltage in the lines 48 and the AC voltage in the lines 46. For this purpose, the power electronics unit 44 is connected to the electrical machine 24 in a three-phase configuration via the three lines 46. To put it more precisely, the lines 46 are electrically connected to coils 64 of a rotor 63.

The active short-circuit operation mode is established by the power electronics unit 44 in such a way that the lines 46 are electrically connected to one another and so the coils 64 are shorted together. Phase-current sensors 65 are arranged within the lines 46, said sensors metrologically detecting a first phase current $I_u$ and a second phase current $I_v$ in the lines 46. Detected measurement values are then transmitted from the phase-current sensors 65 to a block 66 of the control and evaluation unit 54 via the signal paths 52.

The phase-current sensor 65' is an optional phase-current sensor. For this reason, the signal path 52' is illustrated as interrupted. The optional phase-current sensor 65' detects the third phase current $I_w$. It then transmits the corresponding measurement value to the block 66 via the signal path 52'. In alternative embodiments, said third phase current $I_w$ is determined within the control and evaluation unit 54 on the basis of electrotechnical basic equations for the electrical machine 24 as a function of the measurement values for the first phase current $I_u$ and the second phase current $I_v$ from the signal paths 52.

The electrical machine 24 is also operatively connected to an incremental position encoder 70 via a shaft 68. The incremental position encoder 70 produces a measurement value as a function of the rotation of the electrical machine 24. Said measurement value describes a change in rotational angle $\eta_m$ of the rotor 63 of the electrical machine 24. Said change in rotational angle $\eta_m$ is transmitted to the block 72 of the control and evaluation unit 54 via the signal path 54. The block 72 calculates the rotor position $\eta_{el}$ of the rotor 63 as a function of the change in rotational angle $\eta_m$ from the incremental position encoder 70. The rotor position $\eta_{el}$ is transmitted from the block 72 to the block 66 via a signal path 74.

The change in rotational angle $\eta_m$ is also transmitted to a block 76 via the signal path 54. The block 76 calculates a rotational angle speed $T_m$ as a function of the change in rotational angle $\eta_m$. This preferably occurs by differentiating the change in rotational angle $\eta_m$. The rotational angle speed $T_m$ is transmitted to a block 80 via a signal path 78. In block 80, a rotational speed N of the rotor 63 is calculated as a function of the rotational angle speed $T_m$. This preferably occurs by multiplying the rotational angle speed $T_m$ by the factor 60 and dividing the product by the divisor $2\pi$. The rotational speed N resulting therefrom is transmitted to a first comparator 84 and to a second comparator 86 via a signal path 82.

In block 66, the three phase currents $I_u$, $I_v$ and $I_w$ are transformed into a fixed-rotor coordinate system by means of a mathematical transformation, in particular a Park transformation, as a function of the rotor position $\eta_{el}$. A first actual phase current $I_{q\_act}$ and a second actual phase current $I_{d\_act}$ result therefrom.

This can be expressed mathematically as follows:

$$\begin{bmatrix} I_{d\_act} \\ I_{q\_act} \end{bmatrix} = T \begin{bmatrix} I_u \\ I_v \\ I_w \end{bmatrix}$$

Here, T represents the transformation matrix. The first actual phase current $I_{q\_act}$ is then transmitted to the comparator 84 via a signal path 88. The second actual phase current $I_{d\_act}$ is transmitted to the comparator 86 via another signal path 90.

Another block 92 contains a default value Tolerance_$I_q$ for an interval magnitude of a reference range in respect of the actual phase current $I_{q\_act}$. Said default value Tolerance_$I_q$ is transmitted from the block 92 to the comparator 84 via a signal path 94. Correspondingly, a block 96 is provided, which contains a default value Tolerance_$I_d$ for an interval magnitude of a reference range in respect of the actual phase current $I_{d\_act}$. Said default value Tolerance_$I_d$ is transmitted from the block 96 to the comparator 86 via a signal path 98.

The temperature $\eta_{RTemp}$ of the electrical machine 24 is also determined. As illustrated in FIG. 2, this can take place directly via a signal path 99, wherein the temperature $\eta_{RTemp}$ is then directly measured in the electrical machine 24. The measurement value for the temperature $\eta_{RTemp}$ is then transmitted to the comparators 84 and 86 via the signal path 99.

In an alternative embodiment, it is conceivable that a temperature-monitoring means 100 is used to determine the temperature $\eta_{RTemp}$ of the electrical machine 24. The temperature-monitoring means 100 is shown here as an alternative and is therefore illustrated as interrupted. In the event that the temperature-monitoring means 100 is used, the temperature $\eta_{RTemp}$ of the electrical machine 24 is determined inside the temperature-monitoring means 100 itself on the basis of state values of the electrical machine 24, which are supplied to the temperature-monitoring means. The value of the temperature $\eta_{RTemp}$ is then directly transmitted to the comparators 84 and 86 via a signal path 102. In the event that the temperature-monitoring means 100 is used, no direct signal path 99 exists between the electrical machine 24 and the comparators 84 and 86. In other words, the part of the signal path 99, illustrated in FIG. 2, between the line 102 and the electrical machine 24 is then not present.

The comparator 84 has a first characteristic diagram $$I_{q\_ASC} = KF_1(N, \eta_{RTemp})$$

as a function of the rotational speed N and the temperature $\eta_{RTemp}$ of the electrical machine 24. The characteristic diagram $KF_1$ contains reference values $I_{q\_ASC}$ for the actual phase current $I_{q\_act}$.

The comparator 86 has a second characteristic diagram $$I_{d\_ASC} = KF_2(N, \eta_{RTemp})$$

as a function of the rotational speed N and the temperature $\eta_{RTemp}$ of the electrical machine 24. The characteristic diagram $KF_2$ contains reference values $I_{d\_ASC}$ for the actual phase current $I_{d\_act}$.

A Cartesian coordinate system with an ordinate 104 and an abscissa 106 is illustrated within the comparator 84. The ordinate 104 relates to the reference value $I_{q\_ASC}$, that is to say the nominal phase current in amperes. The abscissa 106 relates to the rotational speed N in units of 1/min. A curve 108 is illustrated within the Cartesian coordinate system, which curve illustrates the reference value $I_{q\_ASC}$ as a function of the rotational speed N. For reasons of clarity, only the reference value for a single particular temperature $\eta_{RTemp}$ is shown.

In addition, a reference-value range 110 is illustrated in the coordinate system, within which range the actual phase current $I_{q\_act}$ must lie when the electrical machine 24 is operated in the short-circuit operation mode and has the appropriate rotational speed N. Based on the two arrowheads of the reference-value range 110, two further curves run approximately parallel to the curve 108. Said two curves illustrate the profile of the reference-value range 110 as a function of the rotational speed N.

The comparator 84 can therefore determine the correct reference value $I_{q\_ASC}$ as a function of the detected rotational speed N, the temperature $\eta_{RTemp}$ and the characteristic diagram $KF_1$, by transferring the parameters to the characteristic diagram $KF_1$.

The comparator 84 can then determine the reference-value range 110 as a function of the reference value $I_{q\_ASC}$ and the default value Tolerance_$I_q$. For this purpose, the absolute value of the default value Tolerance_$I_q$ is halved and subtracted from the reference value $I_{q\_ASC}$ for a lower limit of the reference-value range 110. For an upper limit of the reference-value range 110, the halved absolute value is added to the reference value $I_{q\_ASC}$.

The comparator 84 can now check whether the actual phase current $I_{q\_act}$ lies within the reference range 110, wherein the reference-value range 110 is then used as reference value. Depending on the result, the comparator 84 produces a fault indicator in the form of an error bit B_Error_ASC_Iq. Said error bit is set to the value "true" in the event of a fault. In all other cases, the error bit is set to the value "false".

This can be expressed mathematically as follows:

$$B\_Error\_ASC\_Iq := \begin{cases} \text{true} & \forall \quad |I_{q\_act} - I_{q\_ASC}| > \frac{\text{Tolerance\_Iq}}{2} \\ \text{false} & \forall \quad |I_{q\_act} - I_{q\_ASC}| > \frac{\text{Tolerance\_Iq}}{2} \end{cases}$$

A Cartesian coordinate system with an ordinate 112 and an abscissa 114 is likewise illustrated within the comparator 86. The ordinate 112 relates to the reference value $I_{d\_ASC}$, that is to say the nominal phase current in amperes. The abscissa 114 relates to the rotational speed N in units of 1/min. A curve 116 is illustrated within the Cartesian coordinate system, which curve illustrates the reference value $I_{d\_ASC}$ as a function of the rotational speed N. For reasons of clarity, only the reference value for a single particular temperature $\eta_{RTemp}$ is shown.

In addition, a reference-value range 118 is illustrated in the coordinate system, within which range the actual phase current $I_{d\_act}$ must lie when the electrical machine 24 is operated in the short-circuit operation mode and has the appropriate rotational speed N. Based on the two arrowheads of the reference-value range 110, two further curves run approximately parallel to the curve 116. Said two curves illustrate the profile of the reference-value range 118 as a function of the rotational speed N.

The comparator 86 can therefore determine the correct reference value $I_{d\_ASC}$ as a function of the detected rotational speed N, the temperature $\eta_{RTemp}$ and the characteristic diagram $KF_2$, by transferring the parameters to the characteristic diagram $KF_2$.

The comparator 86 can then determine the reference-value range 118 as a function of the reference value $I_{d\_ASC}$ and the default value Tolerance_$I_d$. For this purpose, the absolute value of the default value Tolerance_$I_d$ is halved and subtracted from the reference value $I_{d\_ASC}$ for a lower limit of the reference-value range 118. For an upper limit of the reference-value range 118, the halved absolute value is added to the reference value $I_{d\_ASC}$.

The comparator 86 can now check whether the actual phase current $I_{d\_act}$ lies within the reference range 118, wherein the reference-value range 118 is then used as reference value. Depending on the result, the comparator 86 produces a fault indicator in the form of an error bit B_Error_ASC_Id. Said error bit is set to the value "true" in the event of a fault. In all other cases, the error bit is set to the value "false".

This can be expressed mathematically as follows:

$$B\_Error\_ASC\_Id := \begin{cases} \text{true} & \forall \quad |I_{d\_act} - I_{d\_ASC}| > \frac{\text{Tolerance\_Id}}{2} \\ \text{false} & \forall \quad |I_{d\_act} - I_{d\_ASC}| > \frac{\text{Tolerance\_Id}}{2} \end{cases}$$

The fault indicators B_Error_ASC_Id and B_Error_ASC_Iq are then transmitted to a block 124 via signal paths 120 and 122. The block 124 is a logical OR operation. Said block 124 produces the error signal 58 if one of the fault indicators B_Error_ASC_Id or B_Error_ASC_Iq from the signal paths 120 or 122 has the value "true".

The error signal 58 can then be transmitted to onboard electronics for further processing. The onboard electronics are not shown here. Owing to the fault message, the onboard electronics then ensure there is a reduction in the rotational speed within the motor-vehicle drive train 10. This can take place, for example, by means of a reduction in rotational speed in the internal combustion engine 12.

Alternatively or in addition, a warning message is output to a user on the basis of the error message 58. Said user can then take precautions so that a destabilization of the vehicle does not occur.

The invention claimed is:

1. A method for operating an electrical machine (24) in a short-circuit operation mode, characterized by the steps of:
    detecting at least a first and a second phase current ($I_u$, $I_v$) of the electrical machine (24),
    comparing the detected phase currents with in each case at least one reference value (110, 118) determined as a function of a rotational speed (N) of a rotor (63) of the electrical machine (24) and a temperature ($\eta_{RTemp}$) of the electrical machine (24), and
    outputting an error message (58) if at least one of the phase currents does not match the respective reference value (110, 118).

2. The method as claimed in claim 1, characterized in that a third phase current ($I_w$) is calculated as a function of the first and second phase currents ($I_u$, $I_v$).

3. The method as claimed in claim 1, characterized in that reference-value ranges (110, 118) are used as reference values (110, 118).

4. The method as claimed in claim 1, characterized in that the reference values (110, 118) are determined as a function of characteristic diagrams ($KF_1$, $KF_2$) and the rotational speed (N) of a rotor (63) of the electrical machine (24) and the temperature ($\eta_{RTemp}$) of the electrical machine (24).

5. The method as claimed in claim 4, characterized in that a rotor position ($\eta_{el}$) of the rotor (63) is detected and the rotational speed (N) of the rotor (63) is determined as a function of the rotor position ($\eta_{el}$).

6. The method as claimed in claim 4, characterized in that the temperature ($\eta_{RTemp}$) of the electrical machine (24) is determined by a temperature-monitor (100).

7. The method as claimed in claim 1, characterized in that the phase currents ($I_u$, $I_v$, $I_w$) are transformed into a fixed-rotor coordinate system by a mathematical transformation (T) as a function of the rotor position ($\eta_{el}$), and the reference values (110, 118) are determined in that same coordinate system.

8. The method as claimed in claim 7, wherein the mathematical transformation (T) is a Park transformation (T).

9. The method as claimed in claim 1, characterized in that a rotational speed (N) of a motor-vehicle drive train (10), which interacts with the electrical machine (24), is reduced depending on the error message (58).

10. The method as claimed in claim 1, characterized in that a warning is output to a user depending on the error message (58).

11. The method as claimed in claim 7, wherein the method is applied in a motor vehicle.

12. A device for operating an electrical machine (24) in a short-circuit operation mode characterized by a control and evaluation unit (54), which is designed to detect at least a first and a second phase current ($I_u$, $I_v$) of the electrical machine (24), to compare the detected phase currents with in each case at least one reference value (110, 118) determined as a function of a rotational speed (N) of a rotor (63) of the electrical machine (24) and a temperature ($\eta_{RTemp}$) of the electrical machine (24), and to output an error message (58) if at least one of the phase currents does not match the respective reference value (110, 118).

13. A motor-vehicle drive train (10) having at least one electrical machine (24) in a short-circuit operation mode and having a device for operating the electrical machine (24) as claimed in claim 12.

14. The device for operating an electrical machine (24) in a short-circuit operation mode as claimed in claim 12, wherein the device is used in a motor vehicle.

* * * * *